United States Patent
Kuosa et al.

(10) Patent No.: US 9,424,433 B2
(45) Date of Patent: Aug. 23, 2016

(54) DATA STORAGE MANAGEMENT

(75) Inventors: Jussi Kuosa, Espoo (FI); Hannu Valtonen, Helsinki (FI); Hannu Maaranen, Helsinki (FI); Janne Pänkälä, Helsinki (FI); Kuan Eeik Tan, Espoo (FI); Jarkko Konola, Oulu (FI); Sami Tikka, Vantaa (FI); Jari Sukanen, Espoo (FI); Pirkka Palomäki, Saratoga, CA (US); James Cooper, Sunnyvale, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 138 days.

(21) Appl. No.: 13/371,633

(22) Filed: Feb. 13, 2012

(65) Prior Publication Data

US 2013/0212269 A1  Aug. 15, 2013

(51) Int. Cl.
*G06F 15/173* (2006.01)
*G06F 21/62* (2013.01)

(52) U.S. Cl.
CPC ........ *G06F 21/6218* (2013.01); *G06F 21/6272* (2013.01); *G06F 2221/2103* (2013.01)

(58) Field of Classification Search
CPC . H04L 9/3247; H04L 9/3236; H04L 2209/38; H04L 2209/60; H04L 9/3242; H04L 63/12; H04L 9/3226; H04L 63/0823; H04L 9/3273; H04L 9/0643; H04L 9/0844
USPC ......... 709/225, 203, 217–219, 223, 227–229; 726/1–21, 26–31
See application file for complete search history.

(56) References Cited

U.S. PATENT DOCUMENTS

| | | | |
|---|---|---|---|
| 7,259,875 B1 | 8/2007 | Mazza | |
| 7,624,376 B1 | 11/2009 | Katzer et al. | |
| 8,453,222 B1 * | 5/2013 | Newstadt et al. | 726/7 |
| 8,769,627 B1 * | 7/2014 | Guo | G06F 11/1453 726/20 |
| 2005/0246393 A1 * | 11/2005 | Coates et al. | 707/200 |
| 2006/0135127 A1 * | 6/2006 | Aarnio et al. | 455/412.1 |
| 2006/0248036 A1 | 11/2006 | Stanev et al. | |
| 2008/0098046 A1 | 4/2008 | Alpern et al. | |
| 2009/0106267 A1 | 4/2009 | Bumgarner et al. | |
| 2010/0010906 A1 | 1/2010 | Grecia | |
| 2010/0332456 A1 * | 12/2010 | Prahlad et al. | 707/664 |

(Continued)

OTHER PUBLICATIONS

Ateniese, Giuseppe, et al., "Provable Data Possession at Untrusted Stores", Proceedings of the 14th ACM Conference on Computer and Communications Security, 2007, 25 pgs.

(Continued)

*Primary Examiner* — Ruolei Zong
(74) *Attorney, Agent, or Firm* — Synchronoss Technologies, Inc; Frederick W. Dour (57) ABSTRACT

A method of data storage management. A server receives a data upload request from a remote client, the upload request including information identifying the data to be uploaded. The server determines that a duplicate of the data is stored at a data storage device. The server receives proof of possession information derived by the client from the data using additional information known to the server. On the basis of the received information, the server determines whether to allow the client or a user associated with the client to subsequently access the duplicate data stored at the data storage device.

15 Claims, 4 Drawing Sheets

(56) References Cited

U.S. PATENT DOCUMENTS

| | | |
|---|---|---|
| 2011/0087690 A1 | 4/2011 | Cairns .......................... 707/769 |
| 2011/0302242 A1* | 12/2011 | Kim et al. .................... 709/203 |
| 2012/0310889 A1* | 12/2012 | McNeil et al. ................ 707/639 |
| 2012/0310896 A1* | 12/2012 | Freedman et al. ............ 707/679 |
| 2013/0086381 A1* | 4/2013 | Thomas et al. ............... 713/168 |
| 2014/0101646 A1 | 4/2014 | Buzaski et al. |

OTHER PUBLICATIONS

C. Chris Erway, et al., "Dynamic Provable Data Possession", 2009, 22 pgs.

Building IDL Applications: Files and Input/Output; IDL Online Help; Jun. 16, 2005; As found on the internet at: http://northstar-www.dartmouth.edu/doc/idl/html_6.2/Formatted_and_Unformatted_InputOutput.html.

Mourad Alia et al., "A Middleware Framework for the Persistence and Querying of Java Objects", pp. 25.

H. Krawczyk; M. Bellare; R. Canetti. "HMAC: Keyed-Hashing for Message Authentication; rfc2104.txt", IETF Standard, Internet Engineering Task Force, IETF, CH, Feb. 1, 1997,XP015007888, ISSN: 0000-0003.

* cited by examiner

DATA STORAGE MANAGEMENT

TECHNICAL FIELD

The invention relates to the field of data storage management.

BACKGROUND

Cloud storage of data is a growing way of allowing a user to store data remotely from their own devices. For example, a user may have a large collection of music files and wish to store them in a networked data storage that allows the user to access those files regardless of which device he is using. Data is stored at a networked server, typically operated by a third party that provides a cloud data storage system. Examples of such systems include Google Cloud Storage, iCloud, Drop-Box and FilesAnywhere.

There are several advantages to using cloud data storage. The user is not required to operate and maintain physical storage media themselves, but can leave that to the operator. Furthermore, as cloud storage providers typically have redundancy built into their cloud storage systems, the data is more secure than if it were stored locally in one location and is likely to be lost in the event of, say, a fire, or the storage medium failing.

Of course, it is in the interest of the cloud storage operator to minimize the amount of data that they need to store at their servers. One way to do this is to avoid duplication of certain data. For example, two different users may each own a copy of a particular music file. Rather than storing separate copies of the same file for each user, the cloud storage operator stores a single copy of the music file and gives both users permission to access the file. This is described in, for example, U.S. Ser. No. 12/751,850.

One way that cloud data storage systems attempt to avoid duplication and optimize upload speeds is by the use of one or more hashes of the file to be uploaded. A hash of the file is uploaded from the user to the cloud data storage system. A server in the cloud data storage system compares the uploaded hash value with a hash value of the file (or portions of the file) that is already stored in the cloud data storage system. If the hash values match, then it is assumed that the user has a duplicate of the file already stored in the cloud data storage system, and there is no need to upload the file from the user. However, the user is granted access to the already stored file, as the matching hash values confirm that the user already has a copy of the file. This has the advantage that upload speeds are greatly improved, as there is no need to upload the entire file (or portions of the file) if a copy is already stored in the cloud data storage system.

However, it is possible for a malicious user, who does not have a valid copy of the file, or the right to access a file, to obtain a copy of the hash from an online source. The file name and hash can then be presented to the cloud data storage service as part of an upload procedure. As the hash value presented by the malicious user matches the hash value of the file stored by the cloud data storage service, the cloud data storage service assumes that the malicious user is entitled to access the file and so grants access. The presentation of the hash value by the malicious user only proves that the user knows the hash value; it does not prove that the malicious user has possession of the file. There is therefore a need to improve the security of uploading files to a cloud data storage system.

An obvious way to address this problem is to require that a user uploads the entire file to the cloud data storage system, rather than just a hash derived from the file. The entire uploaded file can be compared with a file already stored in the cloud data storage system. If the files match, then the uploaded file is deleted and the user is granted access to the file already stored at the cloud data storage system. This ensures that the user has ownership of a copy of the file. However, in the case of many uploaded files, or large files, a large amount of time and bandwidth may be required to upload entire files. This increases the bandwidth resources required by the upload server at the cloud data storage system, thereby increasing costs, and also increases the time a user must wait to confirm an upload, thereby giving the user a less satisfactory experience.

There is a need to improve the security of cloud data storage systems in allowing users access to files, while allowing quick uploads of duplicate files that many different users are entitled to access.

SUMMARY

It is an object of the invention to ensure that, when a client attempts to upload a duplicate file to a cloud data storage service, the cloud data storage service can confirm that the client owns a copy of the file even where the client does not upload the file itself.

According to a first aspect, there is provided a method of data storage management. A server receives a data upload request from a remote client, the upload request including information identifying the data to be uploaded. The server determines that a duplicate of the data is stored at a data storage device, so it would be more efficient to simply give the remote client access to the duplicate. However, the client must prove that he is entitled to access the duplicate by showing that he has access to the data locally at the client. The server receives proof of possession information derived by the client from the data using additional information known to the server. On the basis of the received information, the server determines whether to allow the client or a user associated with the client to subsequently access the duplicate data stored at the data storage device.

As an option, the proof of possession information comprises data derived by applying a one way function to the data using the additional information known to the server.

In embodiments of the invention, the additional information known to the server comprises any of client authorization information, predetermined information known only to the client and the server, shared knowledge of a specific part of the data, a collection of hashes of blocks of the data, and validity period data.

In an embodiment of the invention, the remote client sends the proof of possession information in response to an earlier challenge sent by the server.

As an option, the determination whether to allow the client or user associated with the client to subsequently access the duplicate data stored at the data storage device comprises comparing the received proof of possession information derived by the client from the data using additional information known to the server with proof of possession information derived by the server from the duplicate data using the additional information known to the server. If the received proof of possession information matches the proof of possession information derived by the server, the remote client may be allowed to access the duplicate data.

According to a second aspect, there is provided a method of data storage management. A client device sends a data upload request to a remote server. The upload request requests that the data is uploaded to a data storage device, and includes information identifying the data and proof of possession information derived by the client from the data using additional information known to the server.

As an option, the proof of possession information comprises data derived by applying a one way function to the data using the additional information known to the server.

In embodiments of the invention, the additional information known to the server comprises any of client authorization information, predetermined information known only to the client and the server, shared knowledge of a specific part of the data, a collection of hashes of blocks of the data, and validity period data.

As an option, the client may, after sending the data upload request to the server, receive from the server a request for the proof of possession information.

According to a third aspect, there is provided a data storage server comprising a receiver for receiving a data upload request from a remote client, the upload request including information identifying the data. A processor is provided that is arranged to determine that a duplicate of the data is stored at a data storage device accessible by the server. The receiver is further arranged to receive proof of possession information derived by the client from the data using additional information known to the server, and the processor is further arranged to, on the basis of the received information, determine whether to allow the client or a user associated with the client to subsequently access the duplicate data stored at the data storage device.

The server optionally comprises a transmitter for sending a request to the client for the proof of possession information.

As an option, the processor is arranged to compare the received proof of possession information derived by the client from the data using additional information known to the server, with proof of possession information derived by the server from the duplicate data using the additional information known to the server.

According to a fourth aspect, there is provided a client device comprising a processor for generating proof of possession information derived using stored data and additional information known to a remote server, and a transmitter for sending a data upload request to a remote server, the data upload request including information identifying the data and the generated proof of possession information.

As an option, the processor is arranged to generate the proof of possession information by applying a one way function to the data using the additional information known to the server.

The client device is optionally provided with a transmitter for receiving from the server a request for the proof of possession information.

According to a fifth aspect, there is provided a non-transitory computer readable medium storing a computer program which, when run on a server, causes the server to behave as a data storage server as described above in the third aspect.

According to a sixth aspect, there is provided a non-transitory computer readable medium storing a computer program which, when run on a client device, causes the client device to behave as a client device described above in the fourth aspect.

According to a seventh aspect, there is provided a computer program product comprising a computer-readable medium bearing computer program code for use with a computer. The computer program code comprises code for identifying a data upload request received from a remote client, the upload request including information identifying data to be uploaded to a data storage device. Code for determining that a duplicate of the data is stored at the data storage device is also provided. In addition, code for identifying proof of possession information received from the client and derived by the client from the data using additional information known to the server is provided. Code for, on the basis of the received information, determining whether to allow the client or a user associated with the client to subsequently access the duplicate data stored at the data storage device is also provided.

According to an eighth aspect, there is provided a computer program product comprising a computer-readable medium bearing computer program code for use with a computer. The computer program code comprises code for generating proof of possession information derived using stored data possessed by the computer and additional information known to a remote server, and code for sending a data upload request to a remote server, the data upload request including information identifying the data and the generated proof of possession information.

DETAILED DESCRIPTION

The following description is concerned with managing stored data. This may apply to any type of data, but for clarity the following description uses the term "data block". It will be appreciated that the description applies equally to any type of data blocks, such as complete files or portions of files.

Figure 1:
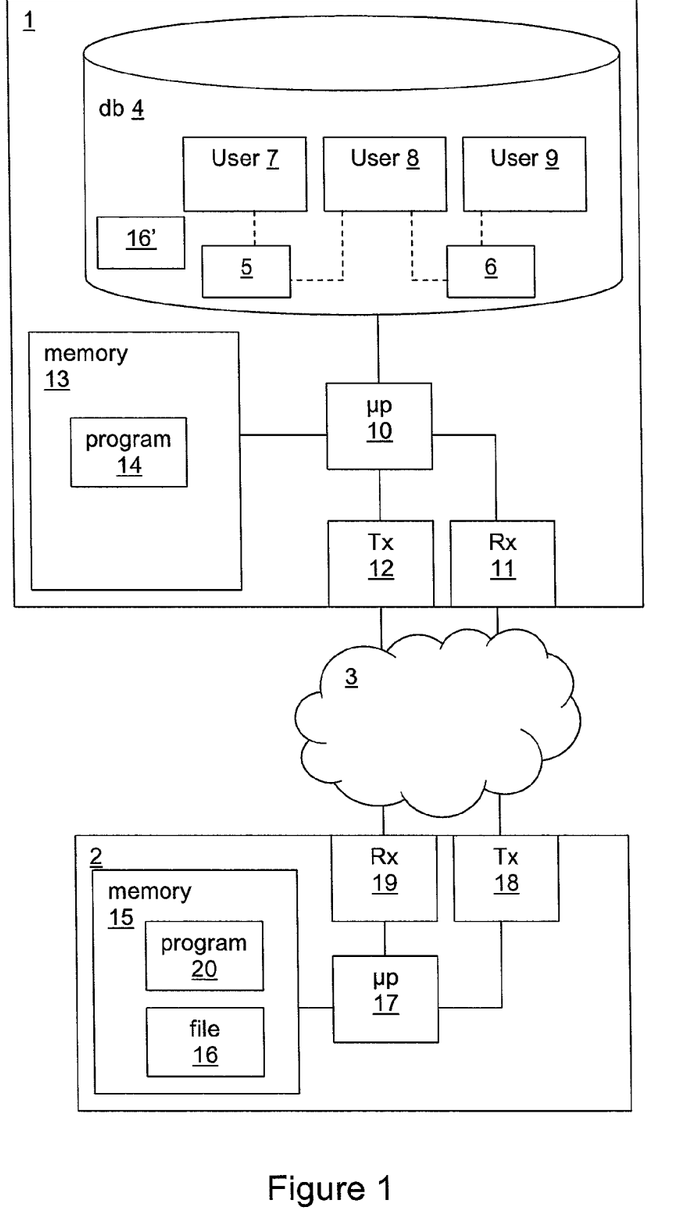
FIG. 1 illustrates schematically in a block diagram a network architecture according to an embodiment of the invention.

Referring to FIG. 1, a server 1 at a cloud data storage system is connected to a remote client 2 by a network 3. The server 1 has a database 4 storing data blocks such as files 5, 6. In some cases several users of the cloud data storage system own copies of the same data block, and so to avoid duplicates only one copy of each duplicated file is stored. In this example, the database 4 includes entries to record that user 7 is entitled to access data block 5, user 8 is entitled to access data blocks 5 and 6, and user 9 is entitled to access data block 6. This ensures that there is no need to store multiple copies of each data block 5, 6.

The server 1 further comprises a processor 10 and a receiver 11, and may also be provided with a transmitter 12. A memory 13 may also be provided on which a computer program 14 can be stored. Of course, more than one memory may be provided and the database 4 may be stored on one or more physical memories.

The client 2 has a memory 15 on which a data block 16 is stored. The client 2 is further provided with a processor 17 and a transmitter 18. The client 2 may also be provided with a receiver 19. The memory 15 (or another memory) may be used to store a computer program 20 that is executable by the processor 17.

When the client 2 wishes to upload the stored data block 16 to the server 1, a check is first made to determine whether the server 1 already has a duplicate of the data block 16' stored in the database 4. If a duplicate of the data block 16' is not stored at the database 4, then the client 2 must upload the entire data block to the server 1. However, if a duplicate of the data block 16' is stored at the database 4, then there is no need for the client 2 to upload the entire data block to the server 1. It is sufficient for the client to prove ownership of the data block 16 for the server to grant the client access to the duplicate of the data block 16'. As described above, one way to prove ownership of the data block 16 is to upload the entire data block, but this is wasteful of bandwidth. Another way to demonstrate ownership of the data block 16 is for the client 2 to upload a hash derived from the data block to the server 1. However, this only proves that the client has obtained a hash of the data block 16, which could be readily obtained sources other than the client 2 deriving the hash from the data block 16 stored in the memory 15. This is therefore a very weak level of proof.

In order for the client 2 to prove to the server 1 that it owns a copy of the data block 16 without having to upload the entire data block 16 to the server 1, it uses the transmitter 18 to send proof of possession data that has been derived from the data block 16 using additional information known to the server. This information should not be readily available such that a modified hash value can be made available to other users. The additional information can be, for example shared information that is only easily known to the client 2 and the server 1. Alternatively, the additional information may include a request from the server 1 for a hash value derived from a specific portion of a file 16, in which case the server 1 and the client 2 both know the specific portion of the file from which the hash value is to be derived. In this way, the proof of possession data will be different for different users, and a single hash value for the entire file will not be sufficient to prove that the client 2 has possession of the file 16.

Figure 2:
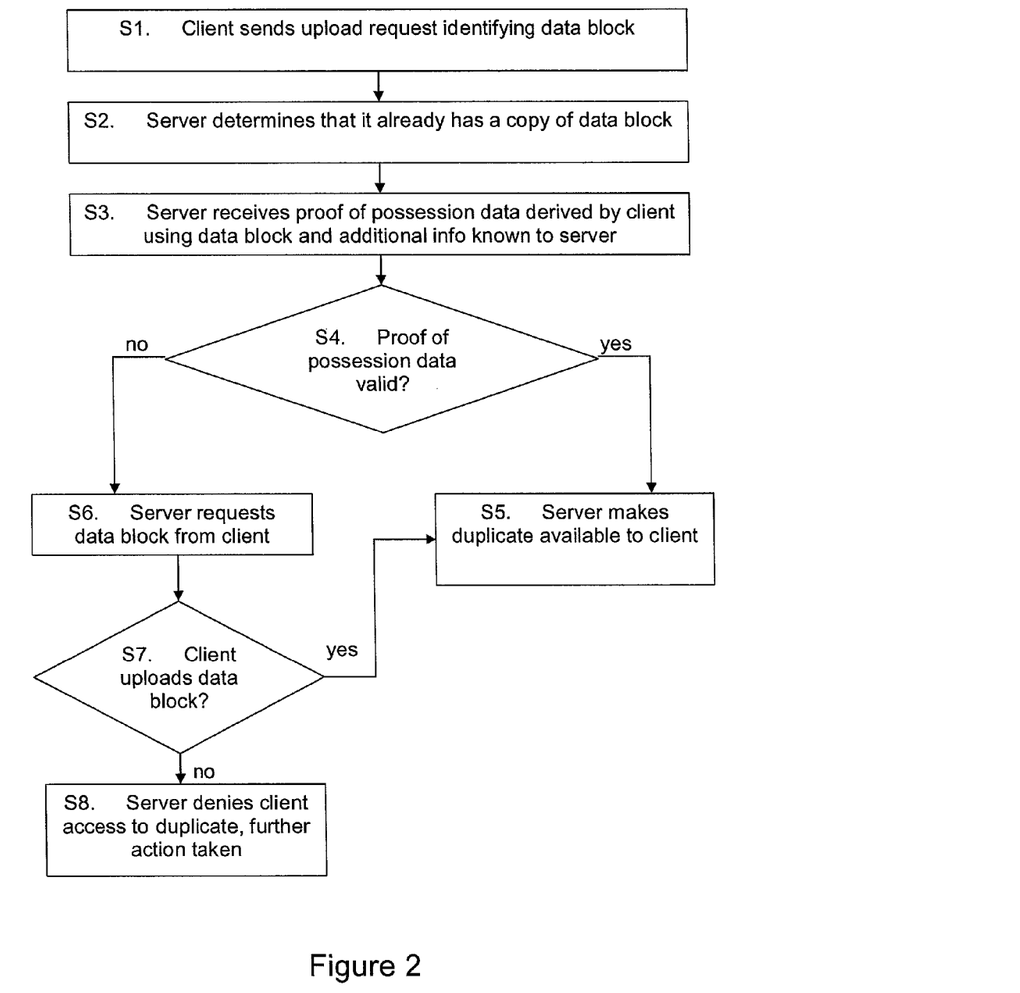
FIG. 2 is a flow diagram showing steps according to an embodiment of the invention.

The steps are illustrated in FIG. 2. The following numbering corresponds to that of FIG. 2.

S1. The client 2 sends an upload request to the server 1. The upload request identifies the data block 16 (for example, using the file name or a hash of the file).

S2. The server 2 determines that it already has a duplicate of the data block 16', and so there is no need for the client 2 to upload the entire data block 16. However, the server 2 still needs to verify that the client 2 has a copy of the data block 16.

S3. The server receives proof of possession data derived by the client 2 using the data block 16 and additional information known to the server 2. There are various types of additional information known to the server 1 that can be used, as described below.

S4. The server 1 determines whether or not the proof of possession data is valid to determine whether or not the client 2 possesses a copy of the data block 16 that corresponds to the duplicate of the data block 16' stored at the server 1. If it is then the steps continue at step S5, and if not then the steps continue at step S6.

S5. The server 1 makes the duplicate of the data block 16' available to the client 2 in the future, as the server 1 is satisfied that when the client made the upload request it was in possession of a copy of the data block 16. The steps end here.

S6. The server 1 determines that the client 2 is not in possession of a copy of the data block, and so does not make the duplicate of the data block 16' stored at the server 1 available to the client 2. It may request that the client 2 uploads the entire data block 16 to the server 2.

S7. If the client uploads the data block 16 to the server 1, the steps continue at step S5, if not then the steps continue at step S8.

S8. The client 2 has neither uploaded a copy of the data block 16 to the server nor been able to demonstrate to the server 1 that it has a copy of the data block, and so the server 1 denies the client 2 access to the duplicate of the data block 16. Further action may be taken.

Note that the above description refers to a client 2. This may include a terminal used to request the upload, or may refer to a user account, allowing a user account to access the duplicate of the data block 16' at a later date regardless of the terminal used to access the server 1. The description also refers to the duplicate of the data block 16' being stored at the server 1, but it will be appreciated that it could be stored using a remote memory to which the server 1 has access. Note also that the above description also refers to a data block. However, the invention applies to data in general, and so may be applied to a plurality of files or portions of files.

By way of example, in a one embodiment of the invention, the client 2 and the server 1 have a shared salt that is unique to the client 2 or changes over time. The data block 16 is a complete file, and when the client 2 wishes to upload the file 16 to the server 1, it uses the shared salt and information from the file in a one way function such as a hash or a checksum to derive proof of possession data that is sent to the server 1. As the server 1 also has the shared salt and a duplicate of the file 16' it can derive the same proof of possession data. If the proof of possession data derived from the file 16 at the client 2 matches the proof of possession data derived by the server 1 using the duplicate of the file 16' in the database 4, then the server can be satisfied that the client 2 owns the file 16. The server 2 can then grant access to the duplicate of the file 16' to the client 2 without requiring the client 2 to upload the entire file 16.

Figure 3:
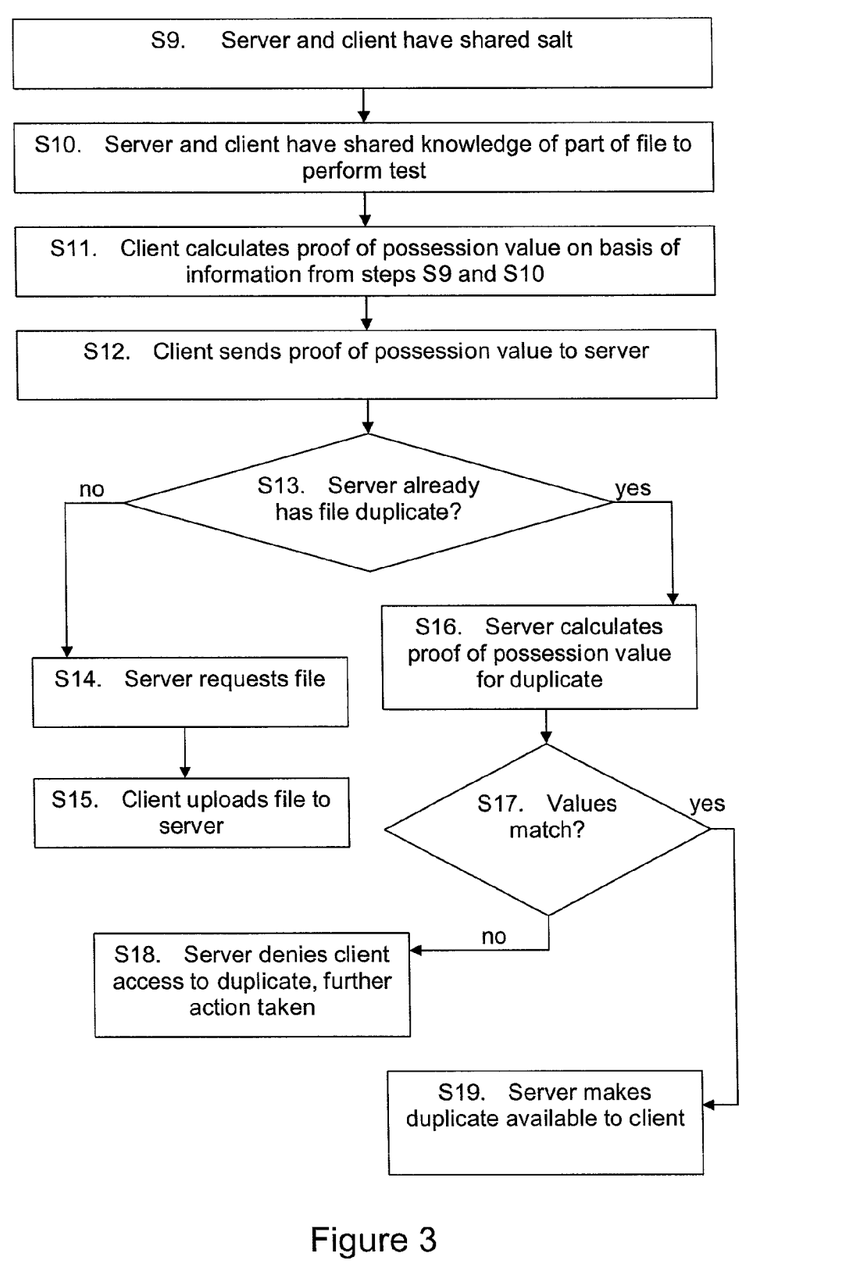
FIG. 3 is a flow diagram showing steps according to a further embodiment of the invention.

FIG. 3 illustrates exemplary steps according to this embodiment, although it will be appreciated that the order of the steps may vary. The following numbering corresponds to that of FIG. 3:

S9. The server 1 and client 2 possess a shared salt that is unique to the client 2 and and/or which is changed over a period of time. There are several types of salt that could be used. For example, the salt could be derived from client authorization information or other information that would be easily known only to the client and the cloud system. Alternatively, the client 2 can request a salt from the server 1, the salt having a time-to-live value, after which a request for a new salt must be made.

S10. The client 2 and server 1 have shared knowledge about which a part of the file 16 on which the proof of possession test is to be performed. This can be, for example, a fixed offset of the file and block side. Alternatively, the client 2 can request the offset and block size from the server 1 either separately or in conjunction with the shared salt request.

S11. The client 2 uses a one way function, such as a checksum or a hash, on a combination of the block from step S10 and the shared salt from step S9. This creates a proof-of-possession value.

S12. When the client 2 sends an upload request to the server 1, the client 2 presents the name of the file and file hash or a collection of hashes of the blocks of the file, together with the proof-of-possession value and, optionally, the validity period of the shared salt described in step 9. In this embodiment, the client 2 can send the proof-of-possession value to the server 1 without needing to respond to a server 1 challenge.

S13. The server 1 determines if it already has a duplicate of the file 16'. If so, then the steps continue at step S16, if not then the steps continue at step S14.

S14. As the server 1 does not have the duplicate of the file 16', it sends a request for the client 2 to upload the file 16.

S15. The client uploads the file to the server 1, after which the server 1 stores a duplicate of the file 16' and makes this duplicate available to the client 2 in the future.

S16. If the server 1 has a duplicate of the file 16' identified by the full file hash or collection of hashes presented by the client 2, the server 1 calculates the same proof-of-possession value or string similarly as described for the client in step S11.

S17. The server 1 determines whether or not the proof of possession value derived by the client 2 matches the proof of possession value derived by the server 1. If so then steps continue at step S19, if not then the steps continue at step S18.

S18. The server 1 denies the client 2 access to the duplicate 16', and may take further action.

S19. The server 1 allows the client 2 to access the duplicate of the file 16' in the future, without the client 2 having to upload the entire file 16. Note that the server 1 may have a counter per user to monitor failed attempts of upload tries that fail the proof-of-possession test. The server 1 may then trigger further action after a certain configurable threshold of failed attempts have been exceeded.

Note also that if the optional validity period for the salt is not valid, the server 1 can either request that the client 2 returns to step S9 and obtain or calculate the shared salt again and start the process over, or request that the client 1 uploads the full file 16 after a configurable threshold (1–n failed attempts) of out of sync shared salt requests.

This embodiment ensures that the server 1 can ascertain that the client has a copy of the file 16, and not just a hash of the file 16. This allow the server 1 to allow the client access to the duplicate of the file 16' already stored by the server 1 without the client 2 having to upload the entire file 16.

Figure 4:
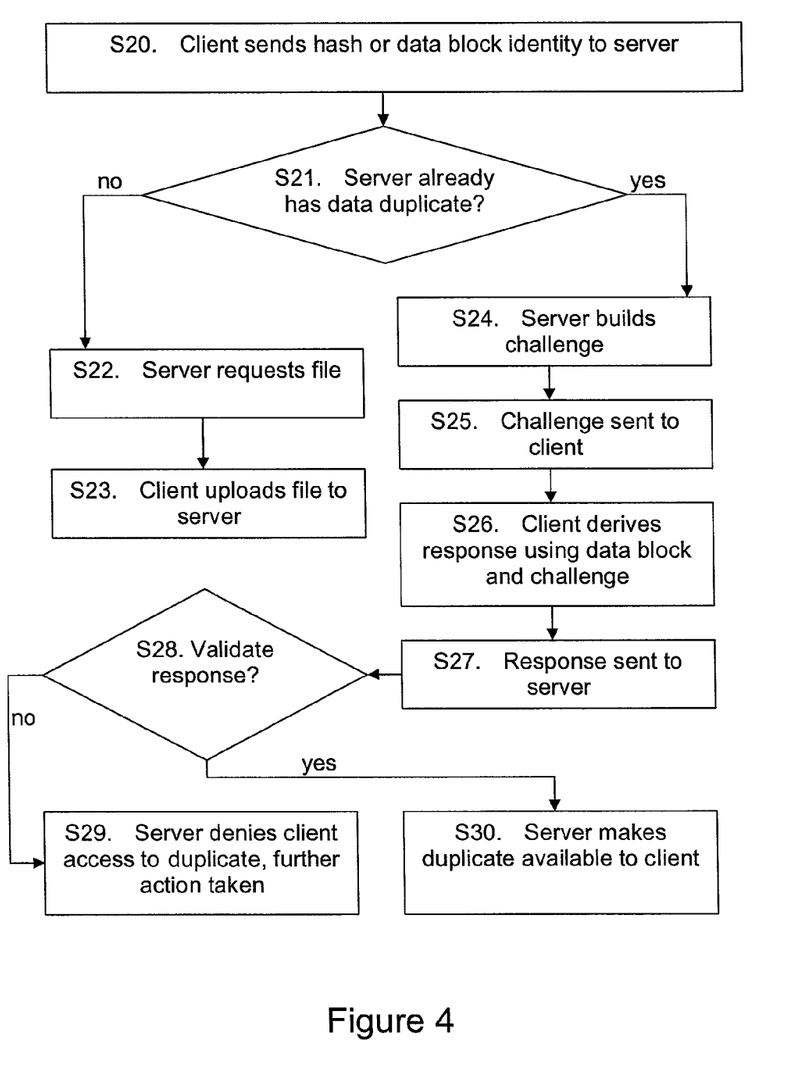
FIG. 4 is a flow diagram showing steps according to a further embodiment of the invention.

In an alternative embodiment, the server 1 sends a challenge to the client 2 requesting information that the client can only provide if it is in possession of the data block 16 rather than just in possession of a hash of the data block 16. This is illustrated in FIG. 4. The following numbering corresponds to that of FIG. 4:

S20. The client 2 sends an upload request to the server 1, the upload request including information identifying the data block 16. This may include a file name, hash of the file etc.

S21. The server 1 determines whether it already has access to a duplicate of the data block 16'. If not then the method proceeds at step S22, if so then the method proceeds at step S24.

S22. The server 1 sends a request to the client 2 to upload the data block 16.

S23. The client 2 uploads the data block 16 to the server 1. The server then stores a duplicate of the data block 16' and makes the duplicate available to the client 2 in the future.

S24. The server 1 builds a challenge that includes N number of byte ranges distributed across the duplicate of the data block 16', and optionally includes an additional one-time key.

S25. The challenge is sent to the client 2.

S26. The client 2 receives the challenge, opens the data block 16 and calculates the hash of the data block contents within the byte ranges. As the server specifies the byte ranges over which a hash should be calculated, a client 2 that only has access to the hash of the data block rather than the data block 16 itself will be unable to build the requested hash value.

S27. The client 2 sends the response back to server 1.

S28. The server 1 validate the client 2 response by checking whether the hash value derived by the client 2 corresponds with the hash value derived by the server 2 over the specified byte range. If not, then the steps continue at step S29, and if so then the steps continue at step S20.

S29. The server 1 denies the client 2 access to the duplicate of the data block 16'. Further action may be taken, such as reporting the client 2 for attempting to gain access to a data block to which it is not entitled, or requesting the client 2 to upload the entire data block 16.

S30. As the hash values match, the server 1 makes the duplicate of the data block available to the client 2 in the future, without the client 2 having to upload the entire data block 16.

The invention ensures that a client that only has the hash value of the data block, rather than the data block itself, will not be able to present the hash value to the server as proof of possession of the data block. The client will need to present different proof of possession information derived from the data block itself using information known to the server. This allows the server to verify that the client is indeed in possession of the data block rather than just in possession of a hash of the data block.

It will be appreciated by the person of skill in the art that various modifications may be made to the above described embodiment without departing from the scope of the present invention. In particular, the system architecture may vary, and a device can use information from a local server or a cloud database, or a backend server can compare the metadata relating to the suspicious software application.

The invention claimed is:

1. A method of data storage management, the method comprising, at a server:
   sending a request to a remote client for a proof of possession information;
   receiving a data upload request from the remote client, the data upload request relating to data stored at the remote client and the data upload request including information identifying the data, and wherein the data upload request does not include the data;
   determining that a duplicate of the data is stored at a data storage device;
   receiving the proof of possession information derived by the client by applying a one way function to a specific portion of the data using client authorization information known to the server and the client, wherein the specific portion of the data is indicated in the request to the client for the proof of possession information, wherein the specific portion of the data is different for different users; and
   on the basis of the received information, determining whether to allow the client or a user associated with the client to subsequently access the duplicate data stored at the data storage device.

2. The method of claim 1, wherein the one way function is applied using any of:
   predetermined information known only to the client and the server;
   shared knowledge of a specific part of the data;
   a collection of hashes of blocks of the data; and
   validity period data.

3. The method according to claim 1, wherein the determination whether to allow the client or user associated with the client to subsequently access the duplicate data stored at the data storage device comprises:
   comparing the received proof of possession information derived by the client from the data with proof of possession information derived by the server from the duplicate data using the client authorization information known to the server.

4. A method of data storage management, the method comprising, at a client:
   receiving a request from a remote server for proof of possession information; and
   sending a data upload request to the remote server, the data upload request relating to data stored at the client and the data upload request requesting that the data to be uploaded to a data storage device, and includes information identifying the data and the proof of possession information derived by the client by applying a one way function to a specific portion of the data using client authorization information known to the server, and wherein the data upload request does not include the data, wherein the specific portion of the data is indicated in the request from the server for the proof of possession information, wherein the specific portion of the data is different for different users.

5. A data storage server comprising:
a transmitter for sending a request to a remote client for proof of possession information;
a receiver for receiving a data upload request from the remote client, the data upload request relating to data stored at the client and the data upload request including information identifying the data, and wherein the data upload request does not include the data;
a processor arranged to determine that a duplicate of the data is stored at a data storage device accessible by the server;
the receiver being further arranged to receive the proof of possession information derived by the client by applying a one way function to a specific portion of the data using client authorization information known to the server, wherein the specific portion of the data is indicated in the request to the client for the proof of possession information, wherein the specific portion of the data is different for different users; and
the processor being further arranged to, on the basis of the received information, determine whether to allow the client or a user associated with the client to subsequently access the duplicate data stored at the data storage device.

6. The server according to claim 5, wherein the processor is arranged to compare the received proof of possession information derived by the client from the data using client authorization information known to the server, with proof of possession information derived by the server from the duplicate data using the client authorization information known to the server.

7. A client device comprising:
a receiver for receiving a request from a remote server for proof of possession information;
a processor for generating the proof of possession information derived by applying a one way function to a specific portion of data stored at the client device using client authorization information known to the remote server, wherein the specific portion of the data is indicated in the request from the remote server for the proof of possession information, wherein the specific portion of the data is different for different users; and
a transmitter for sending a data upload request to the remote server, the data upload request including information identifying the data and the generated proof of possession information, and wherein the data upload request does not include the data.

8. A non-transitory computer readable medium storing a computer program which, when run on a server, causes the server to behave as a data storage server according to claim 5.

9. A non-transitory computer readable medium storing a computer program which, when run on a client device, causes the client device to behave as a client device according to claim 7.

10. A computer program product comprising a non-transitory computer-readable medium bearing computer program code for use with a computer, the computer program code comprising:
code for sending a request to a remote client for a proof of possession information;
code for identifying a data upload request received from the remote client, the data upload request relating to data stored at the remote client and the data upload request including information identifying the data to be uploaded to a data storage device, and wherein the data upload request does not include the data;
code for determining that a duplicate of the data is stored at the data storage device;
code for identifying the proof of possession information received from the client and derived by the client by applying a one way function to a specific portion of the data using client authorization information known to the computer and the client, wherein the specific portion of the data is indicated in the request to the client for the proof of possession information, wherein the specific portion of the data is different for different users; and
code for, on the basis of the received information, determining whether to allow the client or a user associated with the client to subsequently access the duplicate data stored at the data storage device.

11. A computer program product comprising a non-transitory computer-readable medium bearing computer program code for use with a computer, the computer program code comprising:
code for receiving a request from a remote server for proof of possession information;
code for the generating proof of possession information derived by applying a one way function to a specific portion of stored data possessed by the computer and client authorization information known to a remote server, wherein the specific portion of the stored data is indicated in the request to from the server for the proof of possession information, wherein the specific portion of the data is different for different users; and
code for sending a data upload request to the remote server, the data upload request including information identifying the data and the generated proof of possession infounation, and wherein the data upload request does not include the data.

12. The method of claim 4, further comprising:
before sending the data upload request to the server, receiving the client authorization information from the server in response to sending a client authorization information request to the remote server, wherein the client authorization information includes a time-to-live value.

13. The server according to claim 5, wherein the proof of possession information for the client is different from proof of possession information for another client.

14. The method of claim 1, wherein a plurality of clients, including the remote client, is entitled to access the duplicate of the data that is stored at the data storage device.

15. The method of claim 14, wherein based on a determination that the client or the user associated with the client is allowed to subsequently access the duplicated data stored at the data storage device, allowing the client or the user associated with the client to subsequently access the duplicated data stored at the data storage device without having the client having to upload the data in its entirety.

* * * * *